United States Patent [19]

Donelan

[11] 4,436,260
[45] Mar. 13, 1984

[54] OPTICAL SCANNER FOR USE IN CONFINED AREAS

[75] Inventor: Edward J. Donelan, Andover, Mass.

[73] Assignee: The United States of America as represented by the Secretary of the Air Force, Washington, D.C.

[21] Appl. No.: 332,785

[22] Filed: Dec. 21, 1981

[51] Int. Cl.³ .................. F41G 7/22; G02B 27/17
[52] U.S. Cl. .................................. 244/3.16; 350/6.3
[58] Field of Search ................ 244/3.16, 3.17; 250/203 R; 350/484, 6.1–6.4; 356/1

[56] References Cited

U.S. PATENT DOCUMENTS

| | | |
|---|---|---|
| 1,735,108 | 11/1929 | Cox . |
| 2,968,228 | 1/1961 | Merritt .................................. 95/11 |
| 3,253,525 | 1/1964 | Merkel ................................ 95/12.5 |
| 3,283,408 | 11/1966 | Rothe et al. ............................ 33/72 |
| 3,296,443 | 1/1967 | Argyle ................................ 244/3.16 |
| 3,434,771 | 3/1969 | Alvarez ................................ 350/16 |
| 3,614,194 | 10/1971 | Harris .................................... 350/17 |
| 3,884,548 | 5/1975 | Linder .................................. 350/16 |
| 3,910,704 | 10/1975 | Richarme ............................. 350/16 |
| 3,941,451 | 3/1976 | Humphrey ........................... 350/16 |
| 3,944,325 | 3/1976 | Humphrey ........................... 350/16 |
| 4,034,949 | 7/1977 | Hoesterey et al. ................. 244/3.16 |
| 4,125,847 | 11/1978 | Abe ....................................... 356/1 |
| 4,326,799 | 4/1982 | Keene et al. ...................... 244/3.16 |

*Primary Examiner*—Charles T. Jordan
*Attorney, Agent, or Firm*—Donald J. Singer; Jacob N. Erlich

[57] ABSTRACT

An optical scanner for use in a confined or restricted location having a movable prism assembly which utilizes cylindrical or spherical mating joints between a pair of flat input/output surfaces. The mating surfaces are spaced less than one wavelength apart, preferably by an air bearing. The cylindrical members can be used for line scanning while spherical members provide two degrees of freedom of movement. Optical refraction through this movable prism assembly provides a small "exit pupil" scanning with a laser beam.

15 Claims, 7 Drawing Figures

OPTICAL SCANNER FOR USE IN CONFINED AREAS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to optical scanners, and, more particularly, to an optical scanner which is capable of being utilized in conjunction with a laser system, and in an area which is either confined or highly restrictive in size.

With the advent of the miniaturization of many optical systems such as, for example, those found in missiles, it is becoming increasing necessary to scale down the optical components of such systems so as to readily fit within and operate reliably within highly confined or restrictive areas. The scanning of optical beams emanating from a laser system in order to project the beam to some region external of the scanning device through, for example, a window within a missile, places a size limitation upon the scanning device. Particularly, in the use of a long slender missile, the scanning device must be located within the extremely confined location of the nose cone of the missile.

In general, scanning devices which provided a definite fixed high scan frequency were in the form of resonant reflector scanners or rotary reflector polygons. In either case, these devices required clearances for the mirror elements thereof to fold the optical beam path into usually restrictive spaces. If it became desirable to cover large scan angles, large windows were generally required in the customary scanner configurations because the mechanism which produced the angle scan was situated in a position remote from the window. This was especially true of rotary polygon reflector scanners. In such cases, the facets of the polygon were designed large in comparison with the scanned optical beam so that most of the optical energy could be scanned over the required angular field.

As an example, an octagon reflector which is capable of scanning an optical beam through a maximum of 90° range required an optical aperture diameter of 50 mm, and $(p-1)/p$ of the scanned field must be covered by the full 50 mm aperture, which therefore requires the facet width to be p times the optical aperture. Consequently, $(p-1)/p = \frac{2}{3}$ of the scan angle at full aperture and requires the facet to be of a width equal to $3 \times 50 = 150$ mm. The diameter of the octagon (for $\frac{2}{3} \times 90 = 60°$ full aperture coverage) must then be in the area of 392 mm.

The "exit pupil" of this type of scanner is the facet of the octagon. If the window could be placed very near this position then the window size could be 50 mm by 150 mm. But, if the scanner must be contained within, for example, the nose cone of a missile of normal shape then the angular coverage of the optical beam would necessitate the utilization of a very wide window. Consequently, the scanning devices in use today are incapable of handling the scanning requirements of laser systems when utilized in confined or restrictive locations.

It would be highly desirable to provide an optical scanner which is not only reliable in its operation and capable of handling high scan frequencies but is also capable of being situated within a confined space without placing burdensome restrictions upon the optical system with which it is utilized.

SUMMARY OF THE INVENTION

The instant invention overcomes the problems encountered in the past and as set forth in detail hereinabove by providing an optical scanner capable of scanning the output beam of a laser system while situated in restricted or confined locations.

The optical scanner of this invention is capable of providing high frequency scan of, for example, a laser beam when it is necessary to confine the optical system with which it is utilized within a confined area. This invention relies upon the utilization of optical refraction through a movable prism assembly in order to effect a compact mechanization such that a small exit pupil is possible. The optical scanner of this invention is most applicable to the scanning of laser systems because of the monochromatic nature of the laser's output.

It is possible by altering the configuration of the optical scanner to provide two axis movement of the scanner in order to scan the field of view in azimuth and elevation directions. In addition, a simplification of the components of this invention can provide scan in only one axis if required. The optical scanner incorporates therein a movable prism assembly which is made up of a plurality of components having either cylindrical or spherically-shaped mating surfaces situated between flat or planar input/output surfaces. The cylindrical or spherical surfaces which are displaced by less than a wavelength in distance are capable of being rotated with respect to one another by having interposed therebetween any suitable bearing surfaces such as, for example, a gas bearing.

It is therefore an object of this invention to provide an optical scanner capable of being utilized in confined or restrictive areas.

It is another object of this invention to provide an optical scanner which incorporates therein a movable prism.

It is a further object of this invention to provide an optical scanner which is capable of creating a small exit pupil.

It is still another object of this invention to provide an optical scanner which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

DETAILED DESCRIPTION OF THE PREFERRED EMBODIMENT

Figure 1:
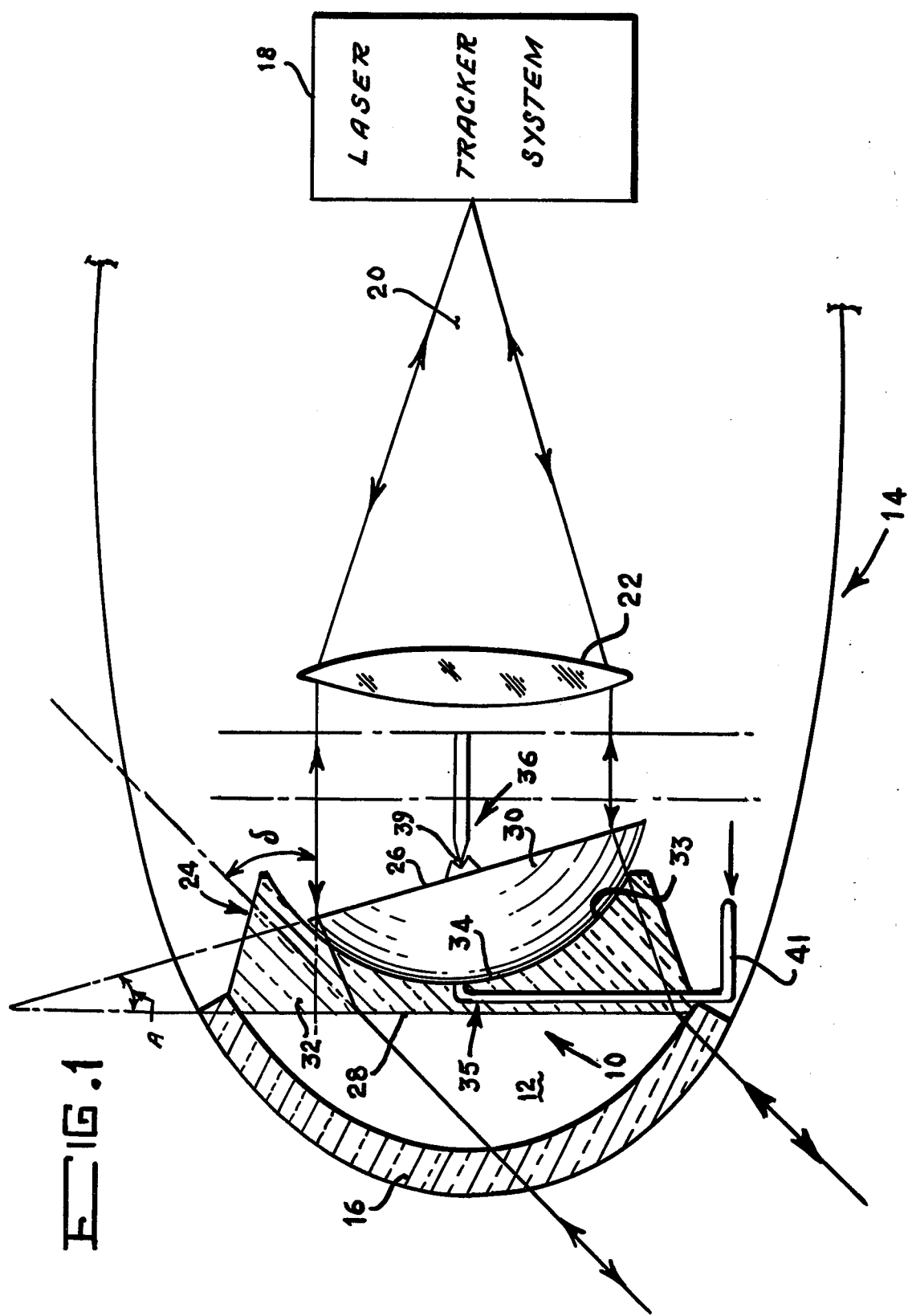
FIG. 1 is a schematic, side elevational representation of the optical scanner of this invention shown located within a missile nose cone and shown partly in cross section.

Reference is now made to FIG. 1 of the drawing which clearly illustrates the optical scanner 10 of this invention situated within a confined area such as the nose cone 12 of a conventional long, slender missile 14. As shown in FIG. 1 optical scanner 10 is situated adjacent a window 16 transparent to a wavelength of interest and located within nose cone 12 of missile 14.

Optical scanner 10 is generally utilized in conjunction with a conventional laser tracker system 18 which outputs and receives a laser beam 20. Laser beam 20 is focused by means of any conventional lens 22 so as to be directed through the optical scanner 10. It should be realized, however, that although optical scanner 10 is shown in conjunction with a missile 14 and laser tracker system 18, optical scanner 10 can be utilized in any instance in which an optical beam is to be scanned over a wide angle and the area in which the optical scanner 10 is to be located is extremely limited, restricted or confined in size.

More specifically, optical scanner 10 is made up of a movable prism assembly 24 having a pair of opposed flat surfaces 26 and 28. In the embodiment depicted in FIG. 1 of the drawing one of the flat surfaces 26 is formed as part of a first movable partially spherically-shaped convex component 30 made of any suitable material such as germanium. The other flat surface 28 is formed as part of a second component 32 having a spherically-shaped (concave) indentation 33 capable of receiving the spherically-shaped convex component 30 therein. In some instances component 32 may be movable or as depicted in FIG. 1 of the drawing fixedly secured to a surrounding housing (not shown) formed as part of missile 14.

It is essential in this invention that the two components 30 and 32 have the same index of refraction and therefore, as an operative example of this invention, both components may be made of the same material such as germanium. In addition, an extremely small spacing 34 is located between components 30 and 32. Spacing 34 must be extremely small, preferably in the order of less than a wavelength. In order to accommodate the movement between components 30 and 32 it is preferable that a substantially friction free non-interfering bearing surface such as air bearing 35 as clearly illustrated in FIG. 2 of the drawing is provided between the two components 30 and 32. Typical movement between components 30 and 32 are shown in phantom in FIG. 2 of the drawing.

Figure 2:
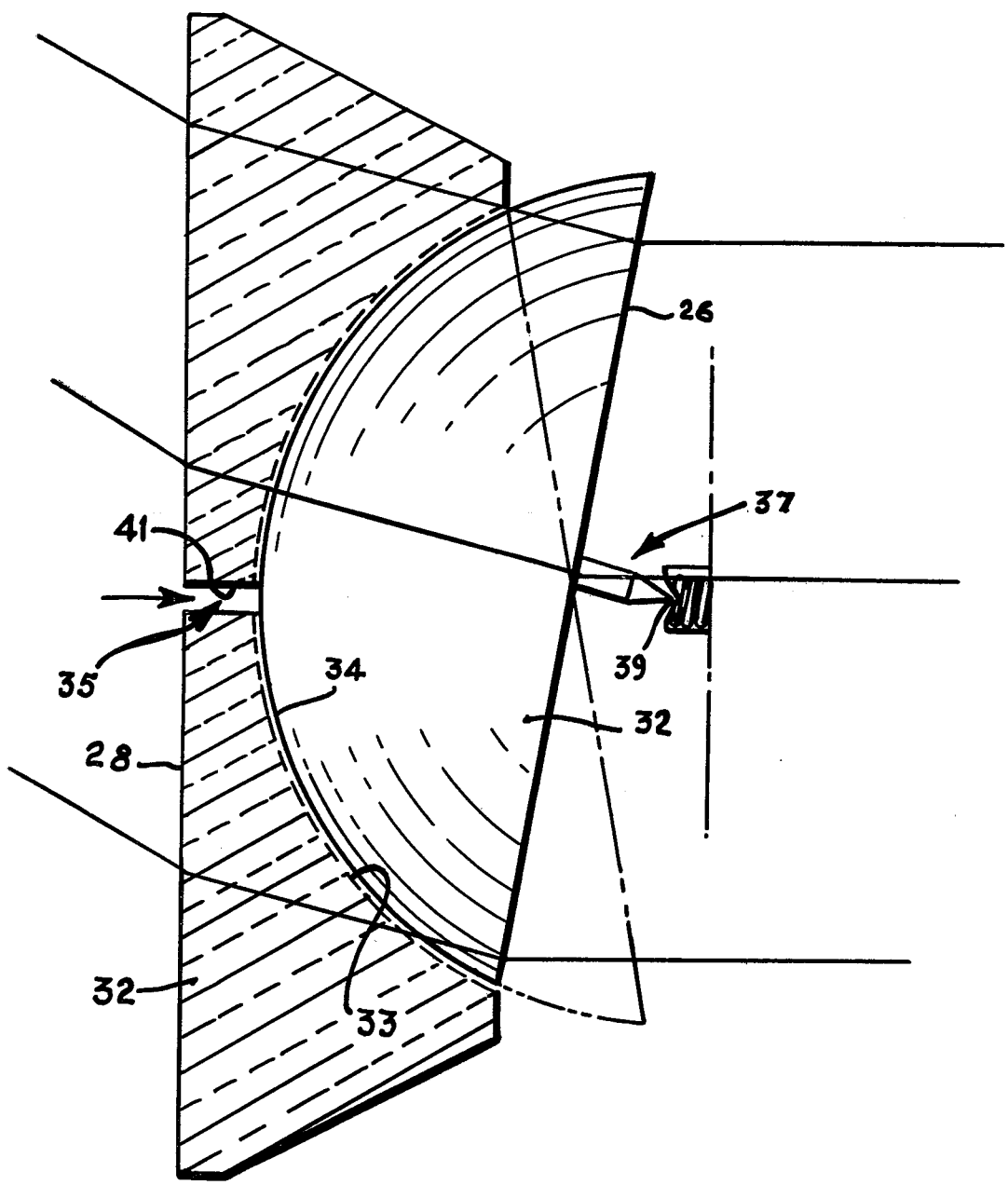
FIG. 2 is a cross sectional view of the optical scanner of this invention illustrating, in particular, the main components of the scanner.

As shown in FIGS. 1 and 2 of the drawing in order to accommodate a two axis or two degree of freedom movement between components 30 and 32 as would be necessary to scan the field of view in azimuth and elevation directions, component 30 is configured as a convex spherical body while component 32 includes a concave spherical-shaped portion. This spherically-shaped mating relationship between components 30 and 32 allow for two degrees of freedom of movement between the components. Any suitable biasing mechanism 36 as shown in FIG. 1 or biasing mechanism 37 as shown in FIG. 2 holds components 30 and 32 together yet permits relative movement therebetween in a manner set forth in more detail hereinbelow.

Still referring to FIGS. 1 and 2, the configuration of the embodiment shown therein of optical scanner 10 uses concentric spherical surfaces which are fitted to a fraction of a wavelength of the optical energy to be scanned. This clearance or space 34 is maintained, during operation, by conventional gas bearing 35 which permits motion between the adjacent surfaces of components 30 and 32. A biasing force is applied at a pivot point 39 near the center of curvature in order to hold components 30 and 32 together while permitting the desired motion therebetween. Pressurized gas is supplied to air bearing 35 through passage 41 in one of the components 32 as shown clearly in FIGS. 1 and 2 of the drawing. This gas forces a space 34 to exist between components 30 and 32.

The index of refraction, n, of the optical components 30 and 32 are identical and control the deflection sensitivity of the optical scanner 10 of this invention. As shown in FIG. 1, the deflection angle $\delta$ is approximately given by the equation $\delta = (n-1)A$, where A is the prism angle. The refractive index, n, of germanium (a preferable material to be used with this invention) is approximately 4 and is most desirable for the operation of, for example, a $CO_2$ laser scanner system 18 at a wavelength of 10.6 $\mu$m. This deflects the beam through 3 times the prism's angular modulation.

Figure 3:
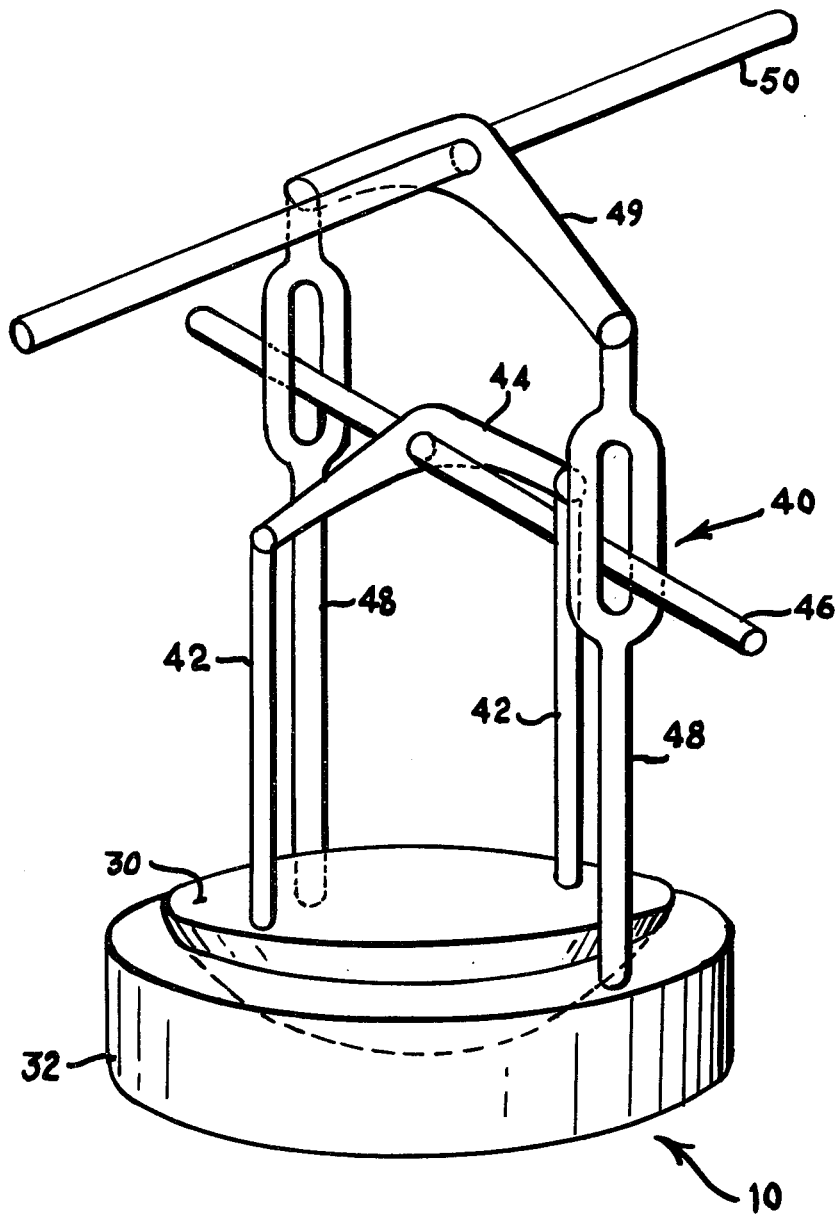
FIG. 3 is a pictorial representation of the optical scanner of this invention illustrating one type of actuating mechanism for use therewith.

The desired motion between components 30 and 32 of movable prism assembly 24 of this invention can be effected by any of a wide variety of electro-mechanical, pneumatic or hydraulic actuators or the like. Reference is made now to FIG. 3 of the drawing which illustrates a mechanically operated actuator system 40. In system 40 a first pair of arms 42 are secured at one end thereof to component 30 and at the other end thereof to a main link 44 which is pivotally mounted on a rod 46. A second pair of arms 48 are secured at one end thereof to component 32 and at the other end thereof to a main link 49 which pivotally mounts upon a rod 50. Subsequent movement of arms 42 and 48 by any suitable conventional drive mechanism (not shown) in conjunction with signals from laser tracker system 18 causes a relative movement between optical components 30 and 32 to take place. This movement provides a full scan of laser beam 20 during operation of the optical scanner 10 of this invention. In the embodiment shown in FIG. 3 of the drawing both components 30 and 32 of the prism 24 are movable. It is possible, however, to incorporate an actuator system 40 wherein only one of the components 30, for example, moves relative to a fixed component 32 as shown in FIG. 1.

Figure 4:
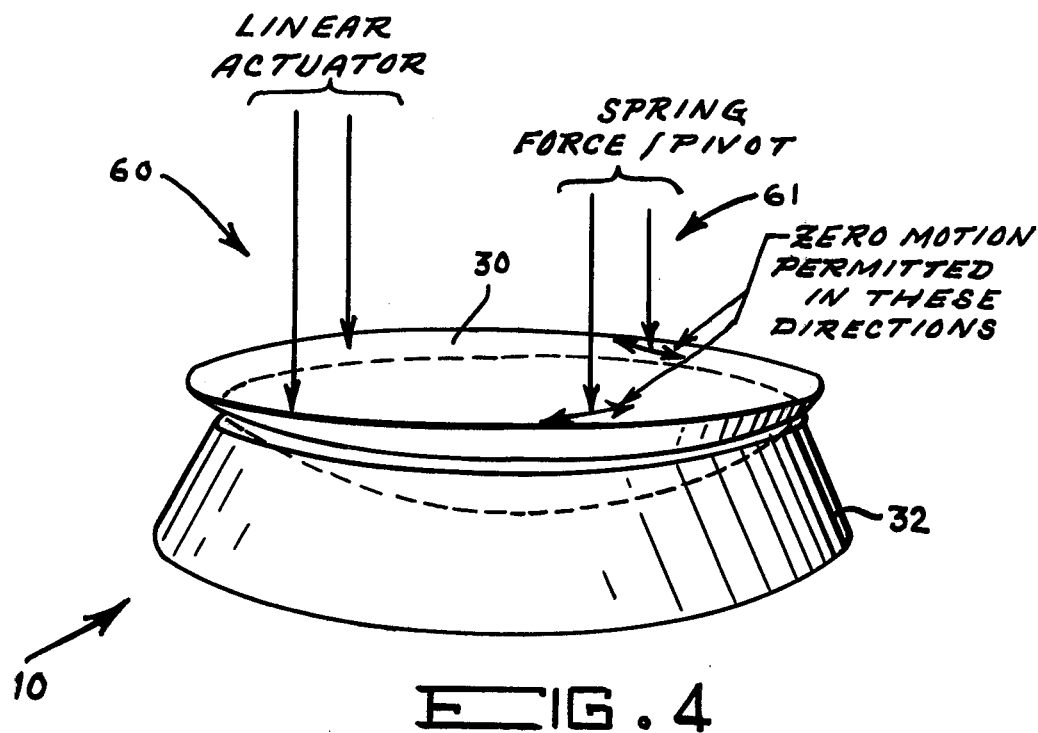
FIG. 4 is a pictorial representation of the optical scanner of this invention illustrating an alternate type of actuator system for use therewith.

FIG. 4 of the drawing illustrates the use of a conventional linear actuator system 60 in which actuation is accomplished by electro-magnetic, pneumatic or hydraulic forces, controlled by electrical signals derived from laser tracking system 18. By the utilization of actuator system 60 shown in FIG. 4 of the drawing and a suitable spring-biased support unit 61 obscuration of the optical aperture can be avoided.

Figure 5:
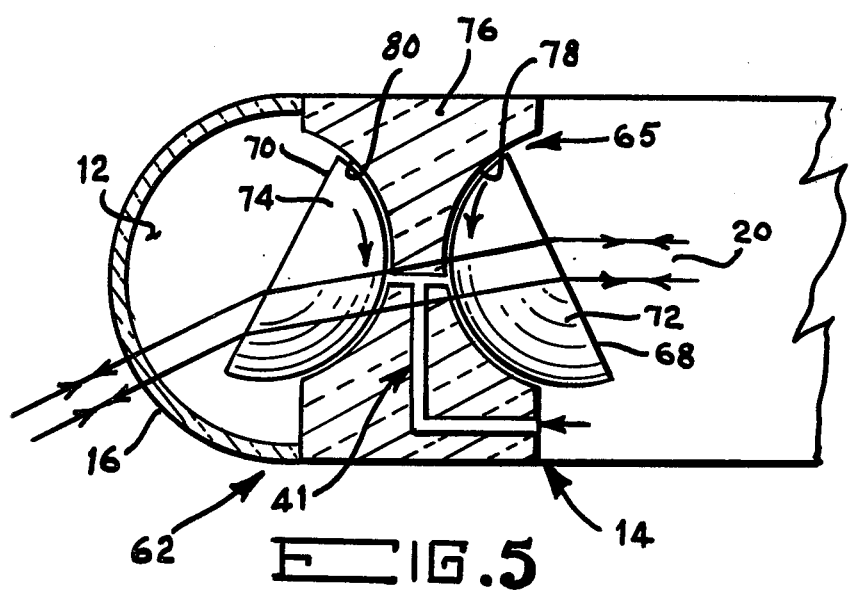
FIG. 5 is a side elevational view of an alternate embodiment of the optical scanner of this invention shown within a missile and shown partly in cross-section.

There are instances where an increased scanning rate of, for example, 100 times/sec would be desirable. The embodiment of this invention illustrated in FIG. 5 of the drawing depicts an optical scanner 62 which not only is capable of producing extremely high scan rates but also substantially eliminates the problems encountered as a result of vibration. As shown in FIG. 5, optical scanner 62 is mounted within the nose cone 12 of an elongated missile 14 of the type shown in FIG. 1 of the drawing.

More specifically, optical scanner 62 is made up of a movable prism assembly 65 having two planar input-/output surfaces 68 and 70. Surfaces 68 and 70 are formed as part of first and second partially spherically-shaped components 72 and 74, respectively. Components 72 and 74 have their convex spherically-shaped portions situated within and movable with respect to a main support 76 which can be fixedly mounted within missile 14. As shown with respect to optical scanner 10 in FIG. 1 of the drawing, concave spherically-shaped portions 78 and 80 of support 76 act as a socket within which components 72 and 74 are movable with respect thereto. Since the remaining elements which make up optical scanner 62 such as air bearings and an actuator system are similar in design to the gas bearing and actuator systems described above their inclusion in FIG. 5 have been omitted for purposes of clearly illustrating the major components of optical scanner 62. It should, however, be noted that movement of components 72 and 74 must take place in opposed directions in a 180° phase relationship as indicated by the arrows in FIG. 5 in order to properly scan beam 20. In addition both optical components 72 and 74 and main support 76 are made of a material having the same index of refraction. As stated above one such preferable material would be germanium.

Figure 6:
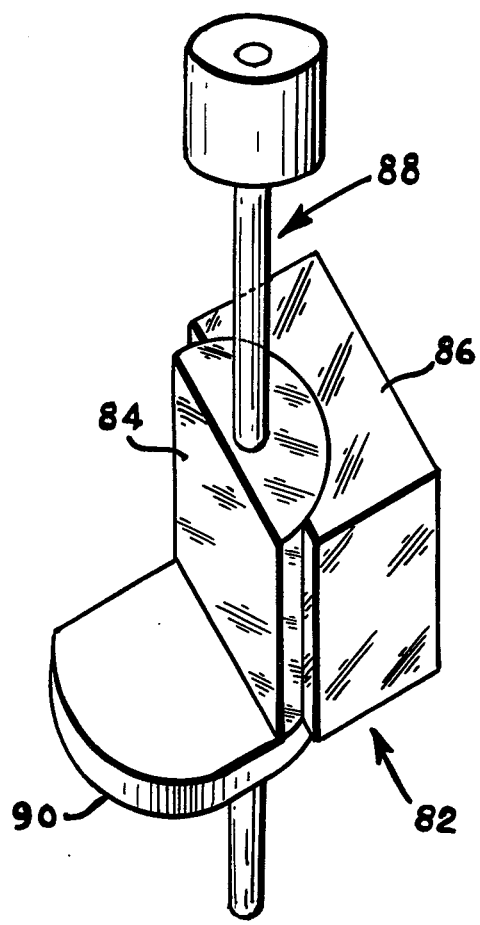
FIG. 6 is a pictorial representation of an alternate embodiment of the optical scanner of this invention.
Figure 7:
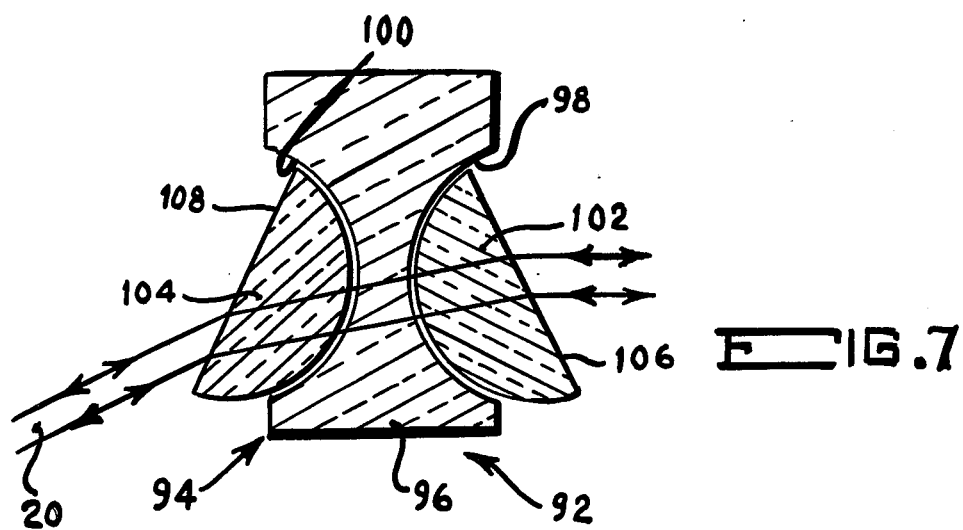
FIG. 7 is a side elevational view of another alternate embodiment of the optical scanner of this invention.

If it is desirable that only one degree of axis movement or one degree of freedom of movement is only necessary in an optical scanner, a single axis scanner 82 as shown in FIG. 6 of the drawing can make up this invention. An application for such an optical scanner 82 could be within the airborne "push-broom" or line scanner in which the invention provides azimuthal scan at some fixed depression angle below the forward horizon and the aircraft motion provides scan along the ground path.

In such a case, components 30 and 32 of optical scanner 10 described with reference to FIG. 1 of the drawing can be replaced with cylindrically-shaped convex and concave optical components 84 and 86, respectively, as shown in FIG. 6 of the drawing. In this embodiment of the invention, component 84 for example, can be moved or rotated with respect to component 86 by any conventional rotary actuator 88. A counter balance weight 90 situated at an end of cylindrical component 84 can be utilized in providing sufficient balance between components 84 and 86 during their operation.

Unfortunately, in some instances optical scanner 82 depicted in FIG. 6 of the drawing may have inherent torsional vibration in the support structure. To alleviate this problem on optical scanner 92 similar in design to optical scanner 62 can be provided. In optical scanner 92, movable prism 94 is made up of three main components. These components include a main support 96 having a pair of oppositely disposed concave cylindrically-shaped portions 98 and 100 therein; as well as a pair of partially convex cylindrically-shaped optical components 102 and 104. As with the other embodiments of this invention described hereinabove the input-/output surfaces 106 and 108, respectively, still remain flat. For proper operation of optical scanner 92, components 102 and 104 must rotate in opposed directions as indicated by the arrows in an 180° phase relationship.

By the utilization of optical scanners 10, 62, 82 and 92 of this invention it is possible to provide the appropriate scanning of a laser beam 20 in a confined area or space without the inherent problems presented by past optical scanners.

Although this invention has been described with reference to particular embodiments, it will be understood that this invention is also capable of further and other embodiments within the spirit and scope of the appended claims.

I claim:

1. An optical scanner for use in a confined area comprising:

a movable prism assembly, said movable prism assembly including a first optical component having a flat surface on one side thereon and a spherically-shaped convex portion adjacent said flat surface, and a second optical component having a flat surface on one side thereof and a spherically-shaped concave portion therein sized to receive said spherically-shaped convex portion of said first optical component therein, both said optical components having the same index of refraction;

said first optical component and said second optical component being mounted with respect to one another for relative movement therebetween;

means interposed between said first optical component and said second optical component for allowing said movement to take place, said means for allowing movement between said optical components being in the form of an air bearing; and means operably connected to at least said first of said optical components for moving said first optical component with respect to said second optical component;

whereby a beam of optical energy directed toward said flat surface of said first optical component exits said flat surface of said second optical component as said first and second optical components move with respect to one another.

2. An optical scanner as defined in claim 1 wherein said means for moving said optical components with respect to each other is operably connected to both said first optical component and said second optical component.

3. An optical scanner as defined in claim 2 further comprising biasing means for operably mounting said optical components with respect to each other.

4. An optical scanner for use in a confined area comprising:

a movable prism assembly, said movable prism assembly including a first optical component having a flat surface on one side thereof, and a second optical component having a flat surface on one side thereof;

means interposed between said first and second optical components for movably mounting said optical components with respect to each other, said first and second optical components and said mounting means all having the same index of refraction;

means interposed between said first optical component and said mounting means and between said second optical component and said mounting means for allowing said movement to take place; and means operably connected to at least said first of said optical components for moving said first optical component with respect to said second optical component;

whereby a beam of optical energy directed toward said flat surface of said first optical component exits said flat surface of said second optical component as said first and second optical components move with respect to one another.

5. An optical scanner as defined in claim 4 wherein each of said optical components has a spherically-shaped convex portion adjacent said flat surface, and said mounting means has a pair of juxtaposed spherically-shaped concave portions sized to receive said spherically-shaped convex portions of said first and second optical components, respectively, and said means for allowing movement between said optical components being in the form of an air bearing situated between said concave spherically-shaped portions of said mounting means and said convex spherically-shaped portions of said optical components, respectively.

6. An optical scanner as defined in claim 5 wherein said means for moving said optical components with respect to each other is operably connected to both said first optical component and said second optical component.

7. An optical scanner as defined in claim 4 wherein each of said optical components has a cylindrically-shaped convex portion adjacent said flat surface, and said mounting means has a pair of juxtaposed cylindrically-shaped concave portions sized to receive said cylindrically-shaped convex portions of said first and second optical components, respectively, and said means for allowing movement between said optical components being in the form of an air bearing situated between said convave cylindrically-shape portions of said mounting means and said convex cylindrically-shaped portions of said optical components, respectively.

8. An optical scanner as defined in claim 7 wherein said means for moving said optical components with respect to each other is operably connected to both said first optical component and said second optical component.

9. An optical scanner for use in a confined area comprising:
a movable prism assembly, said movable prism assembly including a first optical compoent having a flat surface on one side thereof and a cylindrically-shaped convex portion adjacent said flat surface, and a second optical component having a flat surface on one side thereof and a cylindrically-shaped concave portion therein sized to receive said cylindrically-shaped convex portion of said first optical component therein, both said optical components having the same index of refraction;
said first optical component and said second optical component being mounted with respect to one another for relative movement therebetween;
means interposed between said first optical component and said second optical component for allowing said movement to take place, said means for allowing movement between said optical components being in the form of an air bearing; and
means operably connected to at least said first of said optical components for moving said first optical component with respect to said second optical component;
whereby a beam of optical energy directed toward said flat surface of said first optical component exits said flat surface of said second optical component as said first and second optical components move with respect to one another.

10. An optical scanner as defined in claim 9 wherein said means for moving said optical components with respect to each other is operably connected to both said first optical component and said second optical component.

11. In an elongated, slender missile having a laser tracker system for emitting a beam of optical energy of preselected wavelength, a nose cone, a window within said nose cone transparent to said preselected wavelength, the improvement therein being in the form of an optical scanner positioned adjacent said window and optically aligned between said laser tracker system and said window, said optical scanner comprising:
a movable prism assembly, said movable prism assembly including a first optical component having a flat surface on one side thereof and a spherically-shaped convex portion adjacent said flat surface, and a second optical component having a flat surface on one side thereof and a spherically-shaped concave portion therein sized to receive said spherically-shaped convex portion of said first optical component therein, both said optical components having the same index of refaction;
said first optical component and said second optical component being mounted with respect to one another for relative movement therebetween;
means interposed between said first optical component and said second optical component for allowing said movement to take place, said means for allowing movement between said optical components being in the form of an air bearing; and
means operably connected to at least said first of said optical components for moving said first optical component with respect to said second optical component;
whereby said beam of optical energy directed toward said flat surface of said first optical component exits said flat surface of said second optical component as said first and second optical components move with respect to one another.

12. In an elongated, slender missile having a laser tracker system for emitting a beam of optical energy of preselected wavelength, a nose coone, a window within said nose cone transparent to said preselected wavelength, the improvement therein being in the form of an optical scanner positioned adjacent said window and optically aligned between said laser tracker system and said window, said optical scanner comprising:
a movable prism assembly, said movable prism assembly including a first optical component having a flat surface on one side thereof, and a second optical component having a flat surface on one side thereof;
means interposed between said first and second optical components for movably mounting said optical components with respect to each other, said first and second optical components and said mounting means all having the same index of refraction;
means interposed between said first optical component and said mounting means and between said second optical component and said mounting means for allowing said movement to take place; and means operably connected to at least said first of said optical components for moving said first component with respect to said second optical component;

whereby said beam of optical energy directed toward said flat surface of said first optical component exits said flat surface of said second optical component as said first and second optical components move with respect to one another.

13. In an elongated, slender missile as defined in claim 12 wherein each of said optical components has a spherically-shaped convex portion adjacent said flat surface, and said mounting means has a pair of juxtaposed spherically-shaped concave portions sized to receive said spherically-shaped convex portions of said first and second optical components, respectively, and said means for allowing movement between said optical components being in the form of an air bearing situated between said convave spherically-shaped portions of said mounting means and said convex spherically-shaped portions of said optical components, respectively.

14. In an elongated, slender missile as defined in claim 12 wherein each of said optical components has a cylindrically-shaped convex portion adjacent said flat surface, and said mounting means has a pair of juxtaposed cylindrically-shaped concave portions sized to receive said cylindrically-shaped convex portions of said first and second optical components, respectively, and said means for allowing movement between said optical components being in the form of an air bearing situated between said concave cylindrically-shaped portions of said mounting means and said convex cylindrically-shaped portions of said optical components, respectively.

15. In an elongated, slender missile having a laser tracker system for emitting a beam of optical energy of preselected wavelength, a nose cone, a window within said nose cone transparent to said preselected wavelength, the improvement therein being in the form of an optical scanner positioned adjacent said window and optically aligned between said laser tracker system and said window, said optical scanner comprising:

a movable prism assembly, said movable prism assembly including a first optical component having a flat surface on one side thereof and a cylindrically-shaped convex portion adjacent said flat surface, and a second optical component having a flat surface on one side thereof and a cylindrically-shaped concave portion therein sized to receive said cylindrically-shaped convex portion of said first optical component therein, both said optical components having the same index of refraction;

said first optical component and said second optical component being mounted with respect to one another for relative movement therebetween;

means interposed between said first optical component and said second optical component for allowing said movement to take place, said means for allowing movement between said optical components being in the form of an air bearing; and means operably connected to at least said first of said optical components for moving said first optical component with respect to said second optical component;

whereby said beam of optical energy directed toward said flat surface of said first optical component exits said flat surfce of said second optical component as said first and second optical components move with respect to one another.

* * * * *